(12) United States Patent
Brady

(10) Patent No.: US 6,427,782 B2
(45) Date of Patent: Aug. 6, 2002

(54) NOISE SUPPRESSION DRILLING SYSTEM

(75) Inventor: William J. Brady, Creve Coeur, MO (US)

(73) Assignee: The William J. Brady Loving Trust, St. Louis, MO (US)

(*) Notice: Subject to any disclaimer, the term of this patent is extended or adjusted under 35 U.S.C. 154(b) by 0 days.

(21) Appl. No.: 09/741,589

(22) Filed: Dec. 19, 2000

Related U.S. Application Data

(63) Continuation-in-part of application No. 09/543,933, filed on Apr. 6, 2000, now Pat. No. 6,374,932, and a continuation-in-part of application No. 09/260,159, filed on Mar. 1, 1999, now Pat. No. 6,161,635, which is a continuation-in-part of application No. 09/046,382, filed on Mar. 23, 1998, now Pat. No. 6,092,612, which is a continuation-in-part of application No. 08/689,667, filed on Aug. 13, 1996, now Pat. No. 5,875,858, which is a continuation-in-part of application No. 08/472,913, filed on Jun. 7, 1995, now abandoned.

(51) Int. Cl.$^7$ .............................................. E21B 21/08
(52) U.S. Cl. ................... 175/40; 464/180; 173/DIG. 2; 408/83; 408/143
(58) Field of Search ................................. 175/40, 162.1, 175/DIG. 2; 408/81–83, 143, 191

(56) References Cited

U.S. PATENT DOCUMENTS

| | | |
|---|---|---|
| 3,554,306 A | 1/1971 | Wilburn |
| 3,842,610 A | 10/1974 | Willis et al. |
| 4,051,905 A | 10/1977 | Kleine |
| 4,086,972 A | 5/1978 | Hansen et al. |
| 4,094,364 A * | 6/1978 | Lundstrom et al. |
| 4,099,585 A | 7/1978 | Emmerich |
| 4,165,790 A | 8/1979 | Emmerich |
| 4,190,128 A | 2/1980 | Emmerich |
| 4,387,775 A | 6/1983 | Adolfsson et al. |
| 4,474,252 A | 10/1984 | Thompson |
| 4,515,230 A | 5/1985 | Means et al. |
| 4,549,613 A | 10/1985 | Case |
| 4,632,195 A | 12/1986 | Emmerich |
| 4,682,661 A | 7/1987 | Hughes et al. |
| 5,004,382 A | 4/1991 | Yoshino |
| 5,074,025 A | 12/1991 | Willard, III |
| 5,400,861 A | 3/1995 | Sheirer |
| 6,059,051 A | 5/2000 | Jewkes et al. |
| 6,092,612 A | 7/2000 | Brady |
| 6,116,356 A | 9/2000 | Doster et al. |
| 6,161,635 A | 12/2000 | Brady |

* cited by examiner

Primary Examiner—Roger Schoeppel
(74) Attorney, Agent, or Firm—Richard G. Heywood

(57) ABSTRACT

The invention encompasses improvements in noise attenuation systems for reducing the audible noise level generated during earth boring operations using a hard surfaced rotary drill bit, and in dual bore-cutting elements for performing sequential first and second bore cutting to the design bore-gauge.

20 Claims, 5 Drawing Sheets

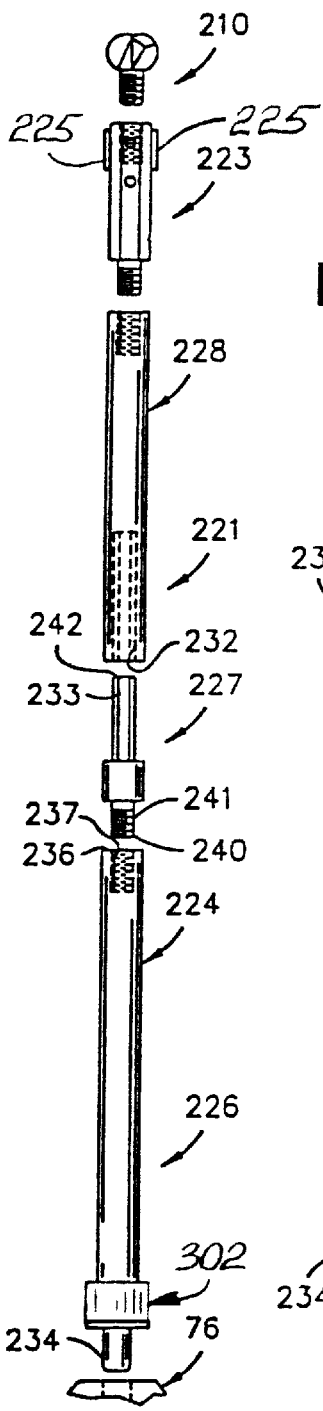
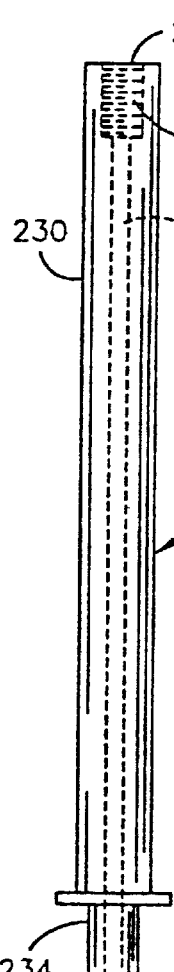
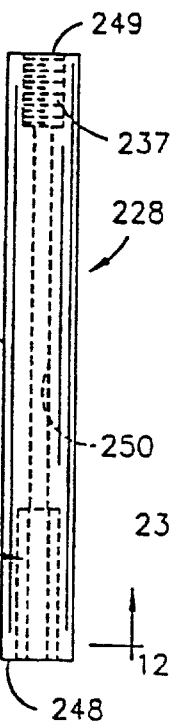
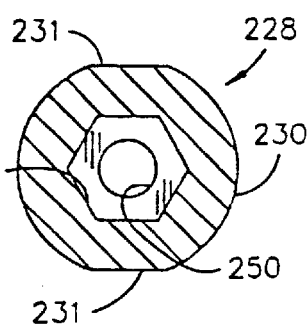
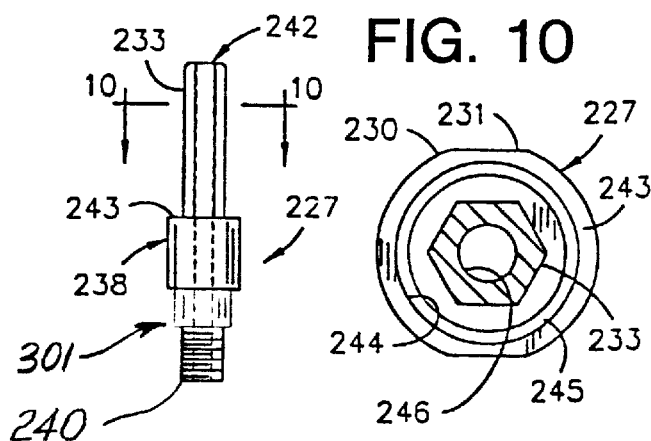

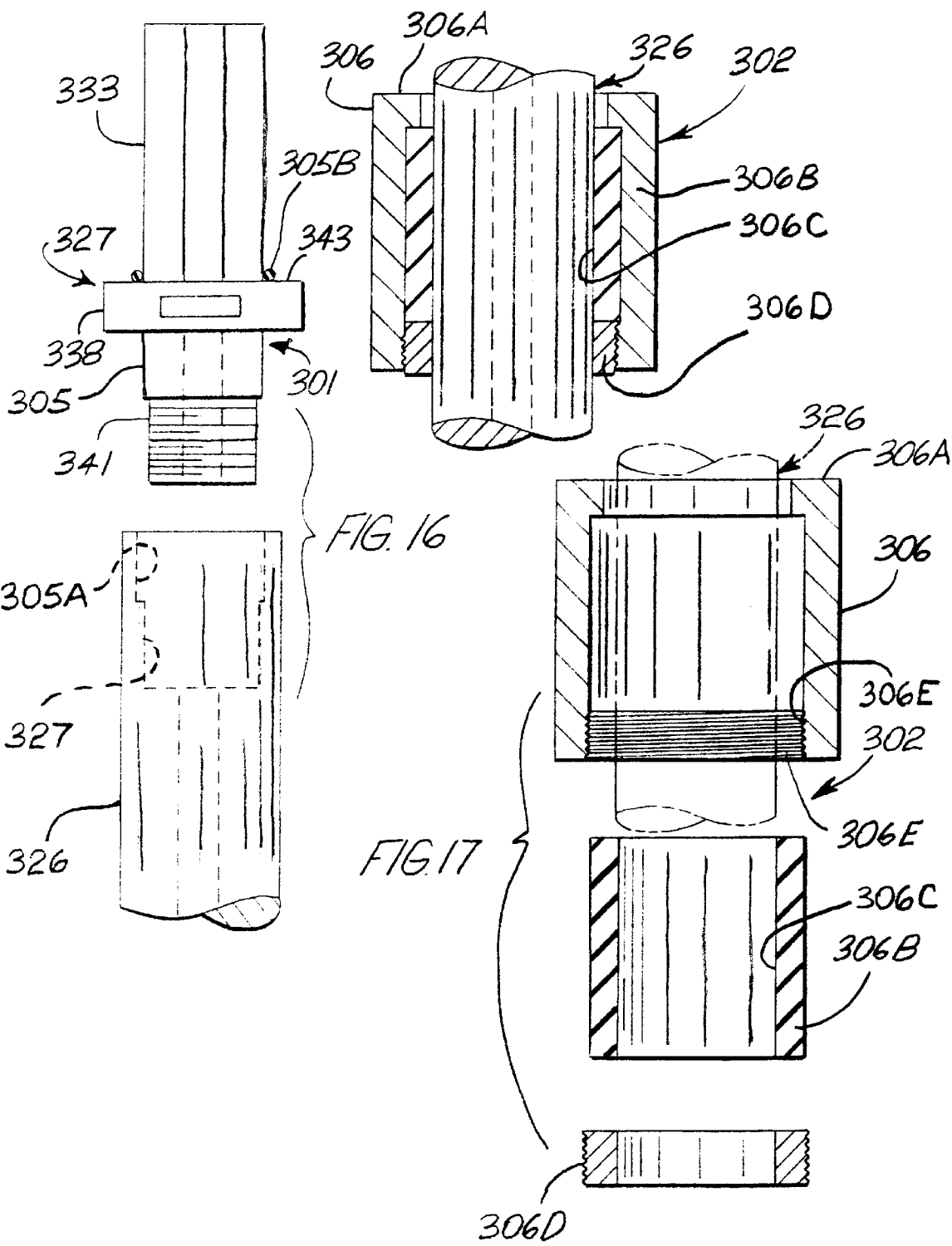

NOISE SUPPRESSION DRILLING SYSTEM

This application is a continuation-in-part of my patent application Ser. No. 09/543,933 filed Apr. 6, 2000, now U.S. Pat. No. 6,374,932 for Heat Management Drilling System and Method and my other patent application Ser. No. 09/260,159 filed Mar. 1, 1999 for Drilling System Drive Steel now U.S. Pat. No. 6,161,635, which is a continuation-in-part of patent application Ser. No. 09/046,382 filed Mar. 23, 1998 for Rotary Drilling Systems (U.S. Pat. No. 6,092,612), which is a continuation-in-part of patent application Ser. No. 08/689,667 filed Aug. 13, 1996 and entitled Low Volume Air-Water Drilling Systems and Methods (U.S. Pat. No. 5,875,858 on Mar. 2, 1999, which is a continuation-in-part of parent patent application Ser. No. 08/472,913 filed Jun. 7, 1995 (now abandoned).

BACKGROUND OF THE INVENTION

1. Field of the Invention

The invention relates generally to rotary drilling systems, and more specifically to improvements for drilling systems as used in drilling and boring for roof bolting operations for tunnel construction, mining and the like.

2. Description of the Prior Art

In the fields of industrial, mining and construction tools, polycrystalline diamond (PCD) is now in wide use in making cutting tool inserts, sometimes called polycrystalline diamond compacts (PDC). PCD materials are formed of fine diamond powder sintered by intercrystalline bonding under high temperature/high pressure diamond synthesis technology into predetermined layers or shapes; and such PCD layers are usually permanently bonded to a substrate of "precemented" tungsten carbide to form such PDC insert or compact. The term "high density ceramic" (HDC) is sometimes used to refer to a mining tool having a PCD insert. "Chemical vapor deposition" (CVD) and "Thermally Stable Product" (TSP) diamond-forms may be used for denser inserts and other super abrasive hard surfacing and layering materials, such as layered "nitride" compositions of titanium (TiN) and carbon ($C_2N_2$) and all such "hard surface" materials well as titanium carbide and other more conventional bit materials are applicable to the present invention.

The principal types of drill bits used in rotary drilling operations are roller bits and drag bits. In roller bits, rolled cones are secured in sequences on the bit to form cutting teeth to crush and break up rock and earth material by compressive and percussive forces as the bit is rotated at the bottom of the bore hole as in mining operations. In drag bits, PCD or like cutting elements on the bit act to cut or shear the earth material. The action of some flushing fluid medium, such as fluid drilling mud, water or a compressed air/vacuum system, is important in all types of drilling operations to cool the cutting elements and to flush or transport cuttings away from the cutting site. It is important to remove cuttings from the hole to prevent accumulations that may plug water passages and otherwise interfere with the crushing or cutting action of the bit; and the cooling action is particularly important in the use of PCD/CVD/TSP cutters to prevent carbon transformation of the diamond material.

Roof drill bits are one form of a rotary drag bit used in roof bolting operations, which are overhead so the drilling operation is upward through earth structures of extremely hard rock or mineral (coal) deposits; and stratas of shale, loose (fractured) rock and mud layers are frequently encountered.

My prior U.S. Pat. Nos. 5,180,022; 5,303,787 and 5,383,526 disclose substantial improvements in HCD roof drill bits using PCD cutting elements constructed in a non-coring arrangement, and also teach novel drilling methods that greatly accelerate the speed of drilling action and substantially reduce bit breakage and change-over downtime.

My prior U.S. Pat. No. 5,875,858 discloses a compressor and air-water mixing system that greatly reduces the amount of water required for effective hole flushing while substantially reducing the amount of respirable dust. My prior U.S. Pat. No. 6,092,612 discloses rotary drilling systems including improvements in drive steel columns and secondary bore reamers whereby to ensure delivery of flushing fluid and effective bit and reamer cooling without substantial pressure loss, and especially using the low volume air mist system of my earlier work. My co-pending application Ser. No. 09/260,159 involved improvements in chuck adaptors for the connection of the drive steel to the chuck of a drilling machine, and my co-pending application Ser. No. 09/543,933 discloses heat management techniques for strengthening PCD and like hard surfaced disc compacts.

One continuing problem in the mining industry has been the high volume of noise generated by the drill bit and drive steel during drilling operations. Environmental regulations prescribe that the noise level shall not exceed 80 DB (maximum) during a work shift of 8 hours whereas the usual amount of noise generated is frequently at or in excess of 100 DB thereby requiring shorter work shifts. Another continuing concern is in the adaptation and utilization of new technology to provide improved drilling systems, apparatus and components.

SUMMARY OF THE INVENTION

The invention is embodied in improvements in rotary drilling systems for drilling bores in earth formations using a hard surfaced rotary drill bit, comprising a noise suppression system associated with a drive steel column for significantly reducing the audible decibel level of drilling generated noise, and dual bore-cutting elements for providing first and second bore cutting to the design bore-gauge specification therefor.

It is an object of the present invention to provide a rotary drilling system that provides a drive steel coupling arrangement for steel column members and a drill bit and having noise suppression means. Another object is to provide a drive steel column having dual bore drilling elements for starting a pilot bore and completing the bore to design specifications. Still other objectives of the invention include substantial noise and vibration abatement at the bore hole and in the drive steel and improved tandem bore-cutting features increasing penetration speed with lower noise generation. Another major objective is to provide a safe, strong drill steel that is dampened against vibration, operates at a significantly lower decibel level, drills at a straighter and faster penetration, and which is economically and correctly fabricated. These and other objects and advantages will become more apparent hereinafter.

BRIEF DESCRIPTION OF THE DRAWINGS

In the accompanying drawings which form a part of this specification and wherein like numerals refer to like parts wherever they occur:

FIG. 7 is an exploded view of a drill steel column and coupling system to which the invention pertains;

FIG. 8 is an enlarged elevational view of a drive steel member of the drive steel column;

FIGS. 9–12 are views of a drive steel column and coupling system from my U.S. Pat. No. 6,092,612 and co-pending application Ser. No. 09/260,159;

FIG. 16 is an exploded elevational view, partially fragmentary, illustrating another noise abatement device for a drill steel coupler;

FIG. 17 is an exploded elevational view of another noise abatement collar of the invention; and FIG. 18 is an enlarged sectional view of the noise abatement collar of FIG. 17.

BRIEF DESCRIPTION OF THE PREFERRED EMBODIMENTS

The present invention pertains generally to mining operations that include roof drilling, longwall mining and continuous mining, and specifically the invention pertains to improvements providing noise abatement, vibration attenuation and enhanced boring speed and accuracy.

Figure 1:
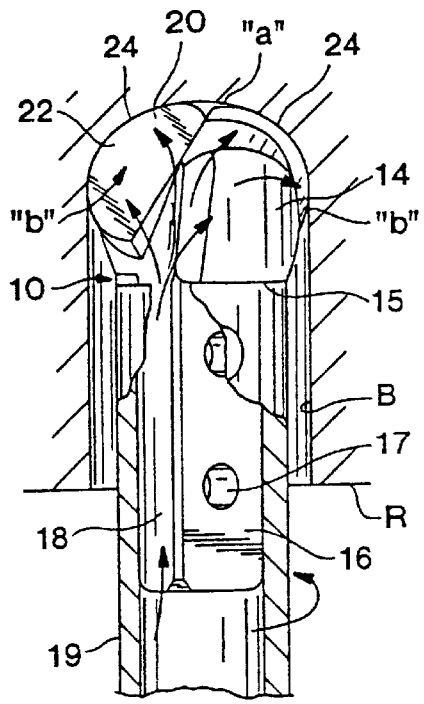
FIG. 1 is a side elevational view, partly broken away, showing one form of a rotary drill bit useful in the present invention.

FIG. 1 shows one embodiment of my earlier non-coring roof drill bit as taught by U.S. Pat. Nos. 5,180,022; 5,303,787 and 5,383,526—the disclosures of which are incorporated by reference. Briefly stated, this non-coring roof drill bit 10 is typically seated on the end of a long rod drive steel 19 (119) of a drilling machine 76, such as a New Fletcher double boom roof bolter (shown in FIG. 6). The bit shank 16 and drive steel 19 have a complementary sliding fit and are typically cross-pinned together at bolt holes 17 or threadedly connected (see FIG. 7) for co-rotational movement. The shank 16 has vertical flutes 18 formed on opposite sides for channeling water or air flushing fluid used for cooling and cleaning the cutter inserts 20 of the drill bit 10. This drill bit embodiment is shown drilling bore B in roof top R, and constitutes a long wearing drill bit that is especially successful in drilling through extremely hard rock formations.

Figure 2:
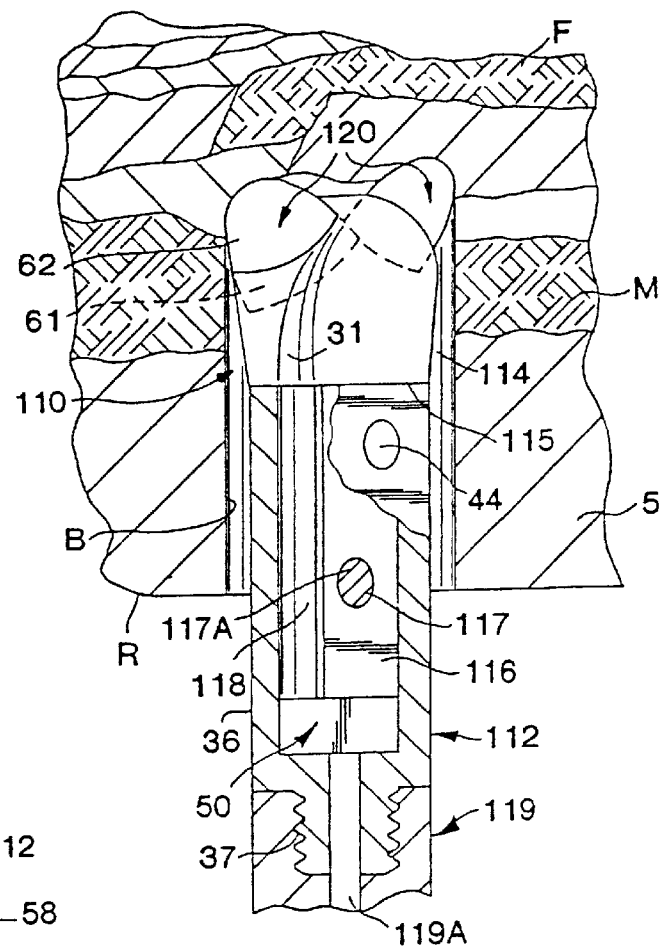
FIG. 2 is a side elevational view, partly broken away, illustrating another form of a rotary drill bit and a bit coupler.
Figures 3, 4:
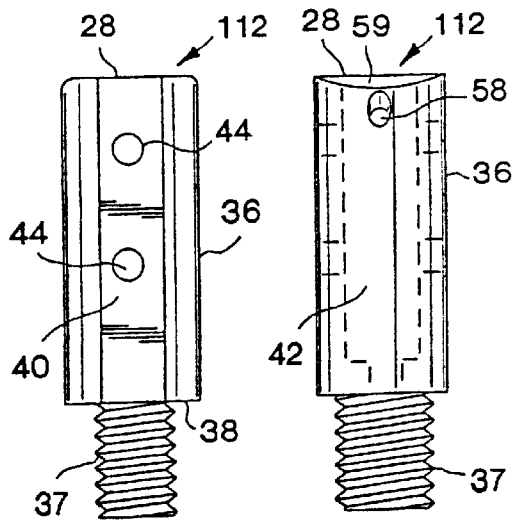
FIG. 3 is a side elevational view of the bit coupler as rotated 45° from FIG. 2.
FIG. 4 is a side elevational view of the bit coupler as rotated 90° from FIG. 3.
Figure 5:
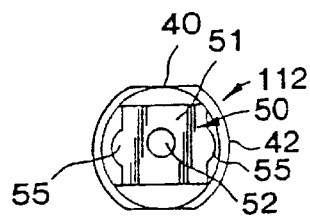
FIG. 5 is a top plan view of the bit coupler.

FIG. 2 shows one embodiment of my earlier coring roof drill bit as taught by my U.S. Pat. No. 5,535,839—the disclosure of which is incorporated by reference. This coring-type drill bit 110 is shown connected through a bit coupler or mounting adapter 112 to a drive steel 119 and operates to drill bore B in the roof R as in a mine or tunnel. The roof top formation in FIG. 2 illustrates solid rock S, fractured rock or shale F and mud seams M. The drill bit 110 has a mounting shank 116 that is secured to the drive column of the drilling machine 76 (see FIG. 6). Although the drill bit 110 could be connected directly to the drive steel 119 (as in FIG. 1), the mounting adapter or coupler 112 of FIGS. 3–5 provides an improved coupling arrangement. The shank portion 116 of the drill bit in this embodiment is also provided with the usual vertical flutes 118 recessed inwardly on opposite sides of the shank and which serve to channel air/vacuum/liquid flushing fluid for cooling the cutter inserts 120 and cleaning away debris from the cutting area of the tool.

The bit coupler or mounting adapter 112 permits assembly and disassembly for replacing the drill bit 110 on the drive steel 119 with a minimum of unproductive downtime. An important function of the coupler 112 is to accommodate the flow of flushing fluid from the drilling machine 76 through bore 119A of the drive steel and bit flutes 118 to the cutter inserts 120. To that end the coupler 112 has a central body chamber 50 that connects a through port or bore 52 to the drive steel chamber 119A. The distribution and the vertical flow of flushing fluid upwardly through the coupler 112 is enhanced by providing vertical water flumes or canals 55 openly exposed to the shank water flutes 118.

Figure 6:
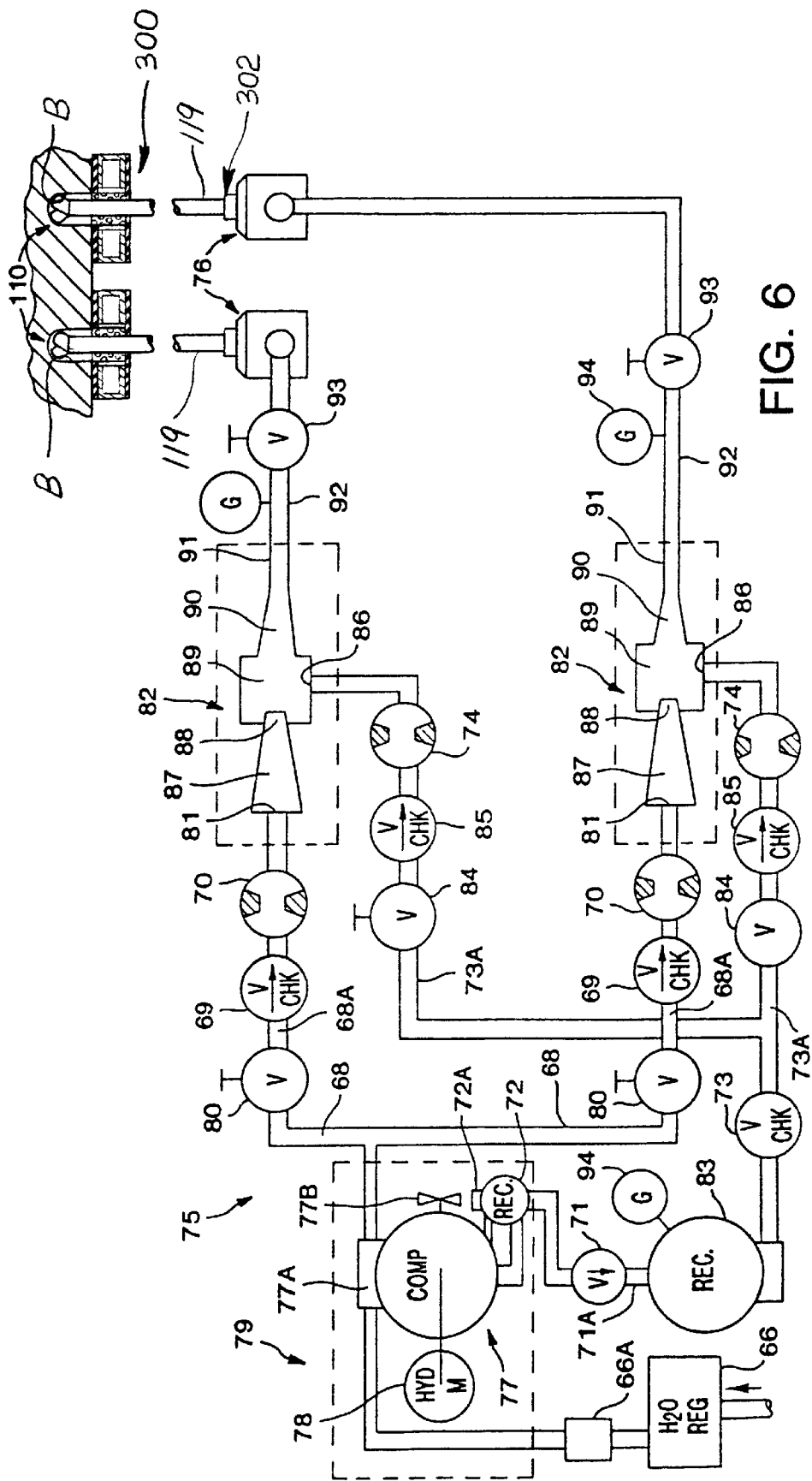
FIG. 6 is a diagrammatic view of an air-water drilling system to which the invention pertains.
Figure 13:
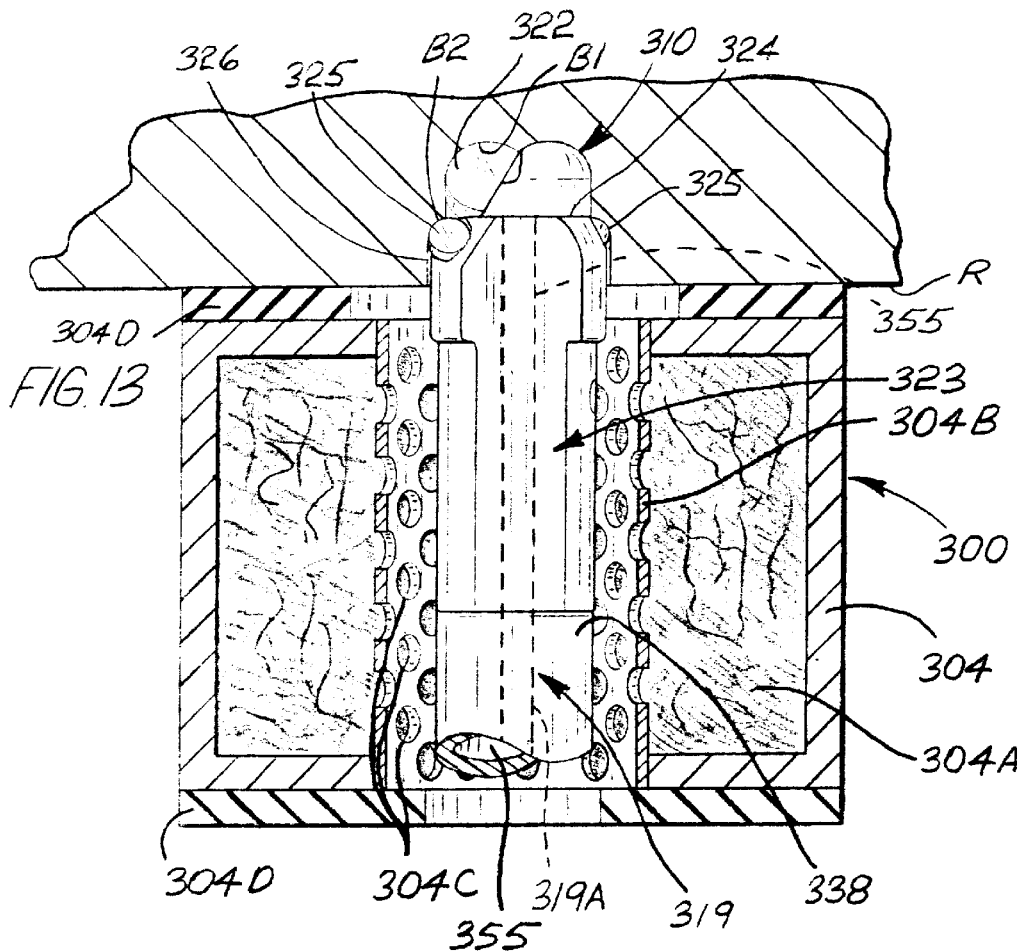
FIG. 13 is a greatly enlarged cross-sectional view, partly broken away and similar to FIG. 2, illustrating the dual drilling system and one noise suppression system of the invention.

Patent application Ser. No. 08/689,667 (U.S. Pat. No. 5,875,858) teaches low volume air-water drilling systems and methods to provide efficient irrigation and drill bit cooling using minimal amounts of water and improving mine safety conditions. A preferred embodiment of such a drilling system is shown in FIG. 6 in which the drilling system 75 uses a double boom New Fletcher roof bolter machine having two machine drives 76 operating vertical long rod drive steel columns 119 to rotationally drive roof drill bits 10, 110, 210 (FIG. 7) or 310 (FIG. 13). As will be readily apparent, the drilling system 75 has a separate flushing fluid handling network for each drilling column 119, although a common air-water source may be employed for double boom machines as will now be briefly summarized.

The system 75 is designed to provide an air-water mist as the flushing fluid for use in roof drilling and other mining operations where the fluid is non-recoverable. A compressor-pump 77 receives a flow of water at about 100–120 psi through inlet line 67 from a water source, and this flow of water coolant to the compressor 77 preferably constitutes the water source for the air-water mist of the system 75. The water flows through the compressor to an adjustable water volume regulating valve 80 and thence is delivered through one-way check valve 69 and an orifice port 70 to the intake port 81 of an atomizing jet pump 82. The orifice restrictor 70 is important to control the flow of water in the internal manifold area 89 of the jet pump so the water does not cut off the air intake and prevent admixing in this chamber.

The air compressor 77 compresses ambient air and delivers it past check valve 71 to a compressed air receiver 73 and thence through a check valve 73 to an adjustable air volume regulating valve 84 providing a constant air output volume in the range of 12.0 to 22.0 cfm at a pressure of about 100 to 120 psi. Compressed ambient air is then delivered at a constant flow rate through another one-way check valve 85 and an orifice restrictor 74 to air intake port 86 of the jet pump 82. Thus, both water and air are delivered into the large mixing chamber 89 of the jet pump 82 at about 120 psi through the respective orifice restrictors 70 and 74 thereby creating a turbulent admixture thereof.

The jet pump 82 typically operates on the principal of entrained fluids. Thus, water flow through a restrictor chamber 87 to a venturi or nozzle 88 produces a high velocity water jet discharge into and across the large manifold chamber 89, which receives air flow from inlet port 86 substantially at right angles. The high velocity water and air streams flowing into and through the chamber 89 are entrained and the flow of pressurized ambient air into the water stream converts the water particles to an air-water mist, which is then pushed or carried forwardly into a diffuser section 90 and out through discharge nozzle 91 connected to a fluid line 92 extending to the drive steel column 119 of the drilling machine 76.

It is of great importance when working with optimum low volumes of air or air-water mist that there be no air loss or leakage in the system that would create problems such as insufficient air to flush cuttings from the drill hole B resulting in plugged drill bits and build up of cuttings, slowed bit penetration and premature bit wear. Thus, my prior application Ser. No. 09/046,382 was directed to improvements in rotary drilling systems having a "no-leak" drill steel coupling and reamer means cooperatively constructed and arranged to deliver optimum drilling fluid flow and remove bore-hole cuttings, as shown and now briefly described with reference to FIGS. 7–12.

FIG. 7 shows a vertically oriented drill steel column and reamer coupler system 221 in exploded view and includes a drive steel starter member 226 (FIG. 8), a drive steel coupler member 227 (FIG. 9, 10), an extension member 228 (FIG. 11, 12) and a reamer bit seat or coupler member 223 (FIG. 7) to seat and couple drill bit 210 to the column 221. In this embodiment the drive steel column has a substantially circular outer wall 230 with opposed longitudinal or axially disposed flats 231 to provide tool-engaging surfaces for assembly and disassembly (FIGS. 10 and 12). A principal feature of that invention was to facilitate such assembly or disassembly while maintaining substantially air tight, sealed joints between the column members during drilling operations, and my drive steel coupling system was developed to employ combinations of threaded ends and socket-type ends having multi-faced sides to provide a non-rotational slip-fit connection. In a preferred embodiment a hexagonal (hex) female end socket 232 on one drive steel or coupler member receives a mating hex male end plug 233 of the adjacent member.

My co-pending application Ser. No. 09/260,150 relates to the chucking connection of the drive steel column 119, 221 or the like with the drilling machine (76) in order to further the sealed integrity of the fluid delivery system from the drilling machine to the drilling bit (10, 110, 210). Thus, the improvement of that invention relates to a fixed chuck shank adapter on the drive end 234 of the lower or first drive steel starter member 226 (FIGS. 7, 8) and which is constructed and arranged for driving connection in the conventional chuck sealing grommet means (not shown) of the drilling machine (76). Referring to FIGS. 7–12, the drive steel starter member 226 has an elongated body 224 shown to be of circular cross-section (230) with flats (231), and has an axial through-bore 235 as the fluid passageway from end to end. The upper second end 236 has an internally threaded female end socket 237. It will be understood that the steel column members could have hexagonal or other exterior shapes instead of circular outer walls (230).

A typical drive steel column may require one or more middle extension drive steel members so as to appropriately position the drill bit (10, 210, 310) for drilling engagement with the roof. FIGS. 9 and 10 show that the half-threaded/half hex connecting system of my earlier disclosures uses a relatively short drive steel coupler member 227 for mounting an extension member 228 on the starter member 226. The coupler member 227 is constructed and arranged with different coupler end means; an exteriorly threaded male end plug 241 on one end and a slip fit hexagonal outer wall on the other end. Both ends having a mating sealing engagement with the ends of adjacent drive steel members, and the coupler 227 having an axial through-bore 246. FIGS. 11 and 12 show one form of a middle extension member 228 joined in the column 221 by coupler 227; and a reamer/bit coupler 223 is connected to the drive steel column and constructed to threadedly receive a drill bit 210. The bit coupler 223 has a through-bore 252 for delivery of flushing fluid to the drill bit, and my prior invention accommodated extended drilling operations with the drill bit (210) by providing reamer means 225 on the bit coupler (223) preferably arranged on opposite outer sides thereof.

My prior inventions presented improvements in rotary drill bits and in drilling systems for more efficient drilling of bore holes and extended drill bit life. It will be seen that prior drill bits have been designed to cut a bore hole to a specified diameter gauge, and my prior bit coupler/reamer (223) is highly effective to maintain such bore specification as the drill bit begins to wear through continued use.

Figure 14:
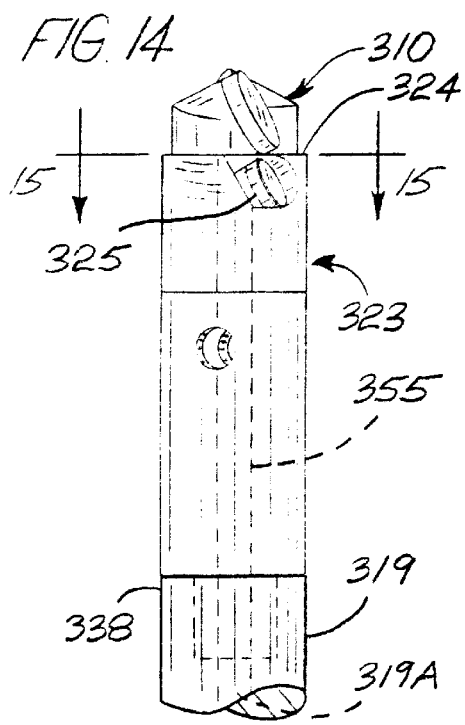
FIG. 14 is an elevational view of the dual drilling system of FIG. 13 as rotated 90° therefrom.
Figure 15:
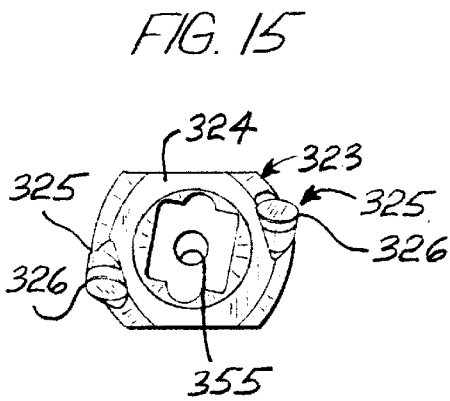
FIG. 15 is a top plan view of the bit coupler component of FIG. 14 as taken along line 15—15 thereof.

The present invention is directed to improvements in the combined drilling system of a rotary drill bit (310) and a bit coupler 323 having novel over-reamer means 325, and in the use of noise abatement means during the drilling operation. Referring to FIGS. 13–15, a dual drilling system embodying the invention comprises a first bore cutter in the form of rotary drill bit 310 secured on a bit coupler 323 that permits assembly and disassembly on a section (338) of drive steel column 319 and accommodates passage of flushing fluids in a through-bore 355 to cool the cutting elements. The coupler 323 is constructed and arranged with a novel second bore cutter in the form of a ceramic reamer bit 325 for drilling the holes piloted by the first cutter drill bit 310 to the prescribed design bore-gauge dimension. In the preferred embodiment a pair of ceramic disc cutters 325 are mounted on opposite sides of the bit adapter or coupler 323 at the top or entry end 324 thereof. These second cutters 325 are typical of my other diamond-faced drill bit inventions, and have a working cutter element or insert supported on a tungsten carbide base or the like. The outer gauge-cutting margins 326 of the second cutters project outwardly of the coupler body and the disc cutting faces are set at a negative rake angle of 15° and a negative skew angle of about 7°, or in the ranges taught in my U.S. Pat. No. 5,180,022 for instance. As shown best in FIG. 13, the first drill bit 310 is constructed and arranged with ceramic cutter inserts 322 (as described with reference to the bits and 210) and, in operation, start and cut a pilot bore B1. The second cutters 325 follow immediately and cut or ream the bore B2 to its full design gauge specification.

The dual bore-cutting system of drill bit 310 and the second "over-reamer" cutter inserts 325 allows faster penetration into rock and other structures and for drilling straighter holes due to the small pilot bore (B1). My co-pending application Ser. No. 09/543,933 (incorporated by reference) teaches heat management techniques for stress relief in the manufacture and assembly of cutter discs, and provides a way of eliminating delamination and chipping to thereby make the second over-reamer cutter practical and cost effective. Further, the second bore-cutter arrangement constitutes a primary cutting arrangement of two or more cutting elements, as in combination with the pilot bit 310, "over-reamer" as used here being distinguished from an under-reamer arrangement for secondary cutting if necessary to maintain bore-gauge.

The dual bore-cutting system is relevant in the general area of noise abatement, as to which this invention also pertains. The full size or single bore cutting drill bit 10, 210 of my earlier inventions along with other prior art drills, has been known to generate excessive noise levels exceeding 100 decibels and ranging up to 137 db depending on cutter blade material and sharpness, drill speeds and pressure, type and hardness of materials being cut, etc. This has resulted in government regulations mandating that the noise level to which an operator is subjected shall not exceed 80 db for an eight (8) hour period. A smaller first pilot bit 310 of 1-1/32" for cutting bore B1 to a gauge of 1-3/8" to 1-1/2" bore size or a pilot bit 310 of 1-3/8" for cutting bore B1 to a gauge of 1-5/8" to 3" will clearly generate a noise level significantly lower than a single full sized bore bit with a gauge of 1-1/2" to 3". In this respect, even a reduction of as little as 2 db is considered to be a "significant" level noise abatement change. Further, the additional noise level that will be generated by the second cutters of the dual bit system will still be lower than that of the single bore bit because of the easier or reduced cutting forces required to "over-ream" and because different noise harmonics will be generated.

Still referring to FIG. 13, and also to FIGS. 16–18, the present invention contemplates at least three additional noise abatement forms. FIG. 13 discloses a silencer or muffler device 300 for suppressing primary noise levels generated at the drilling site; FIG. 16 shows a coupler noise dampener 301; and FIGS. 17 and 18 show a drill steel collar 302 for attenuating noise and vibration of the drill steel. Variable test procedures with changes in thrust pressure, rotational speed, fluid circulation and various combinations of noise suppression units seem to establish that primary noise sourcing occurs at the bore hole. Thus, a principal embodiment for noise attenuation is the silencer device 300 of FIG. 13.

The silencer 300 comprises an annular drill steel circumscribing means that acts to dampen or attenuate the audible decibel level of drilling generated noise in the hole. This silencer has an annular collar formed as a C-shaped metal outer shell 304 packed with fiber glass 304A or like noise absorbing material and closed on its inner annulus by a cylindrical liner 304B of metal or suitable plastic that is perforated (at 304C). The top and bottom of the outer shell 304 have rubber caps or cushions 304D. The silencer 300 defines a central passageway through the liner 304B in which the drill steel column will work to bore holes B1, B2 into the roof structure R. The silencer will be pressed against the roof-circumscribing the bore entry site by a suitable hydraulically operated attachment arm (not shown) associated with the drilling machine 76.

Referring to FIGS. 9 and 16, the noise dampening device 301 is constructed and arranged to attenuate noise and vibration occurring at a coupler unit 227 between steel column members (276 and 228). As described, this coupler (227, 327) may be constructed with different end joining means; a threaded male plug 241, 341 on one end and a hexagonal slip-fit out wall 233, 333 on the other. The enlarged central section 238, 338 matches with the exterior configuration of the steel column members (226) and the coupler has a through-bore for flushing fluids. The noise dampener 301 comprises an annular collar 305 of rubber, neoprene or like resilient material that is arranged to abut the central section at the threaded male end 341. The drill steel member (226) may be provided with a large bore 305A to accommodate the dampener collar 305 which is compressed by the threaded connection of the male end 341 to the threaded counterbore (237, 337) of the adjacent drive steel member (226, 326). An annular O-ring 305B is provided at the enlarged central section shoulder (243, 343) for abutment with the mating section at that end 333.

Referring to FIGS. 17 and 18, the outer dampener collar 302 is similar in construction and concept to that of FIG. 16. This collar 302 has an annular outer metal jacket 306 with an inturned keeper flange 306A at one end, and the other end 306E is threaded. An inner resilient dampener sleeve 306B is molded into the outer jacket 306 and has a central bore 306C sized to receive a drill steel member. A compression locking cap 306D is threadedly received into the end 306E. The collar 302 is preferably applied to the starter drive steel member 226 adjacent to the chuck end 234 where speed variations first occur in drilling operations.

The noise and vibration dampening means of the present invention result in significant reduction in audible decibel levels generated during drilling.

It is now apparent that the objects and advantages of the present invention have been met. Changes and modifications of the disclosed forms of the invention will become apparent to those skilled in the mining tool art, and the invention is only to be limited by the scope of the appended claims.

What is claimed is:

1. A rotary drilling system having a drill steel column for cutting bores in earth formations, comprising noise suppression means for significantly reducing the audible decibel level of drilling generated noise, said noise suppression system comprising annular means constructed and arranged for use in association with a drive steel column during drilling operations including a noise attenuating unit having a central bore to accommodate part of the steel column, said noise attenuating unit being a muffler device for placement in a bore hole circumscribing location and including sound absorbing material.

2. The drilling system of claim 1, in which said muffler device comprises an annular structural casing of C-shaped cross-section and packed with sound absorbing material, and a cylindrical perforating liner defining a central opening for the steel column.

3. A rotary drilling system having a drill steel column for cutting bores in earth formations, comprising noise suppression means for significantly reducing the audible decibel level of drilling generated noise, said noise suppression system comprising first and second bore-cutting means constructed and arranged to operate at different noise generating levels with a significantly lower aggregate noise, and the first bore-cutting means being a rotary drill bit for drilling a pilot bore hole smaller than the final bore size.

4. The drilling system of claim 3, in which the second bore-cutting means comprises over-reamer insert means for cutting a pilot bore hole to the final bore gauge specification therefor.

5. The drilling system of claim 4, in which said second bore-cutting means comprises a drill bit coupler for connecting a rotary drill bit on one end to a drive steel column on its other end, and at least two over-reamer insert means carried on said coupler adjacent to the one end thereof.

6. The drilling system of claim 3, in which the second bore-cutting means comprises a drill bit coupler section having one end for connecting the rotary drill bit and a second end for connection to a drive steel column, and said second bore cutting means including a pair of over-reamer inserts mounted at the one end of the coupler adjacent to the drill bit thereon.

7. The drilling system of claim 6, in which said over-reamer insert means comprise hard surfaced insert discs having outer bore gauge cutting margins, and said insert discs being mounted on said coupler at preselected negative rake and negative skew angles laid back relative to an axial plane normal to the direction of rotation.

8. The drilling system of claim 7, in which the negative rake angle is about 15°, and the negative skew angle is about 70°.

9. The drilling system of claim 3, in which said second bore-cutting means is located adjacent to said rotary drill bit for reaming bores to the design bore-gauge specification therefor.

10. The rotary drilling system of claim 3, in which said drill steel column has at least one tubular drill steel member with an outer wall section, and said noise suppression means includes a vibration dampening unit having an annular resilient body of substantial axial length sized to have a predetermined snug fit at the outer wall section of the tubular member.

11. The rotary drilling system of claim 10, in which said tubular member is a starter section of the drill steel column having a chuck end adapted to be removably attached to the chuck of a drilling machine, and said vibration dampening unit is applied to annularly circumscribe the outer wall section of the tubular member adjacent to the chuck end thereof.

12. The rotary drilling system of claim 11, in which said annular resilient body of said vibration dampening unit is constructed and arranged to have a different wall thickness at one axial portion thereof.

13. The rotary drilling system of claim 10, including at least two of said tubular members and the one of which is a coupling unit having a coupling section of reduced annular cross-section adjacent to a larger wall section thereof, and said annular resilient body of said vibration dampening unit being applied to the coupling section in axial abutment with the larger wall section thereof.

14. The rotary drilling system of claim 13, in which the other of said tubular members is constructed and arranged to be removably attachable to the coupling section of the one tubular member and exert an axial compressive force against the annular resilient body of said vibration dampening unit.

15. The rotary drilling system of claim 13, in which said one tubular member is constructed and arranged for removably attaching a drill bit to its coupling section with compressive force against the annular resilient body of said vibration dampening unit thereon.

16. A rotary drilling system having a drill steel column for cutting bores in earth formations, comprising noise suppression means for significantly reducing the audible decibel level of drilling generated noise, said noise suppression system comprising annular means constructed and arranged for use in association with a drive steel column during drilling operations including a noise attenuating unit having a central bore to accommodate part of the steel column, said noise attenuating unit comprising an annular resilient collar for placement in circumscribing engagement with a portion of the drive steel column.

17. The drilling system of claim 16, in which the steel column includes a coupler having an enlarged central section and at least one threaded end connector, and said annular resilient collar is mounted against the central section and adapted for vibration attenuating compression between the coupler and a connected steel column member.

18. The drilling system of claim 17, in which the connected steel column member has a coupler-receiving end with an outer cavity to accommodate said resilient collar, and a threaded inner counterbore for connection to the coupler threaded end.

19. The drilling system of claim 16, in which the steel column includes a starter section for driving connection to a drilling machine and at least one other section, coupler means for connecting said sections, and in which the resilient collar is strategically mounted in circumscribing relationship with one of said sections for vibration attenuation thereof.

20. The drilling system of claim 19, in which said resilient collar is contained within an outer shell having an open end, and means for compressing the resilient collar within said shell and onto the one steel column section for securing the noise suppression means thereto.

* * * * *

UNITED STATES PATENT AND TRADEMARK OFFICE
CERTIFICATE OF CORRECTION

PATENT NO.     : 6,427,782 B2
DATED          : August 6, 2002
INVENTOR(S)    : William J. Brady It is certified that error appears in the above-identified patent and that said Letters Patent is hereby corrected as shown below:

<u>Column 9,</u>
Line 3, the number "70°" should be changed to -- 7° --.

Signed and Sealed this

Twenty-ninth Day of October, 2002

*Attest:*

*Attesting Officer*

JAMES E. ROGAN
*Director of the United States Patent and Trademark Office*